United States Patent
Barnhart et al.

(10) Patent No.: US 11,206,947 B1
(45) Date of Patent: Dec. 28, 2021

(54) GRILL ASSEMBLY FOR COOKER

(71) Applicants: Andrew P. Barnhart, Millersburg, OH (US); Leon Martin, Millersburg, OH (US)

(72) Inventors: Andrew P. Barnhart, Millersburg, OH (US); Leon Martin, Millersburg, OH (US)

( * ) Notice: Subject to any disclaimer, the term of this patent is extended or adjusted under 35 U.S.C. 154(b) by 306 days.

(21) Appl. No.: 16/434,693

(22) Filed: Jun. 7, 2019

Related U.S. Application Data

(60) Provisional application No. 62/681,765, filed on Jun. 7, 2018.

(51) Int. Cl.
  *A47J 37/00* (2006.01)
  *A47J 37/07* (2006.01)
  *A47J 37/04* (2006.01)

(52) U.S. Cl.
  CPC ......... *A47J 37/0704* (2013.01); *A47J 37/041* (2013.01); *A47J 37/0786* (2013.01); *A47J 2037/0795* (2013.01)

(58) Field of Classification Search
  None
  See application file for complete search history.

(56) References Cited

U.S. PATENT DOCUMENTS

| | | | |
|---|---|---|---|
| 4,442,762 A * | 4/1984 | Beller | A47J 37/0704 99/340 |
| 5,782,224 A | 7/1998 | Rabell | |
| 7,841,270 B2 | 11/2010 | Holbrook | |
| 8,656,829 B2 | 2/2014 | Ciaciura | |
| 8,656,903 B1 | 2/2014 | Branton et al. | |
| 2004/0031478 A1 * | 2/2004 | Gifford | A47J 37/0704 126/25 AA |
| 2016/0174767 A1 * | 6/2016 | Schlosser | A47J 37/0704 126/25 R |
| 2017/0119209 A1 * | 5/2017 | Jenks | A47J 37/041 |
| 2019/0059652 A1 * | 2/2019 | Kohli | A47J 37/0786 |

FOREIGN PATENT DOCUMENTS

WO  WO-2007031035 A1 *  3/2007  ............ A47J 37/041

OTHER PUBLICATIONS

2018 Meadow Creek Barbecue Equipment Catalog, at least the chicken cookers on pp. 4-8 are admitted prior art.

* cited by examiner

*Primary Examiner* — Blake A Tankersley
(74) *Attorney, Agent, or Firm* — Zollinger & Burleson Ltd.

(57) ABSTRACT

A grill assembly includes first and second grills between which items to be cooked can be clamped. The grill assembly can be placed above the firebox of a kamado-style ceramic charcoal barbecue cooker. While in place within the cooker, the grill assembly can be rotated at least 180 degrees to allow both side of the items to be grilled direct access to the heat from the fire box of the cooker. The grill assembly can be rotated 360 degrees in either direction.

19 Claims, 16 Drawing Sheets

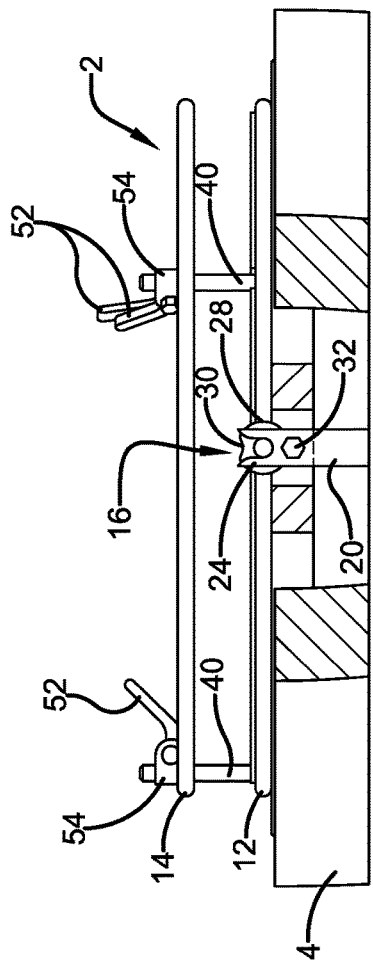
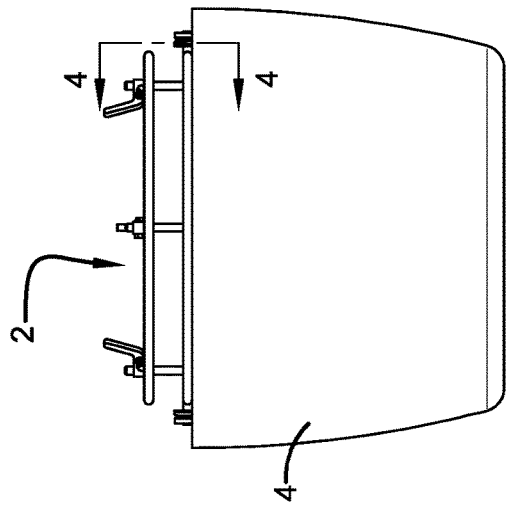
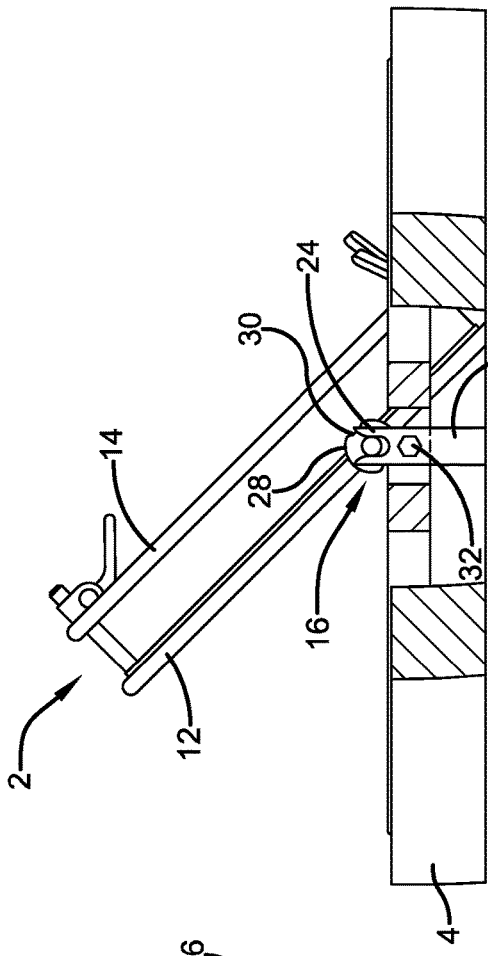
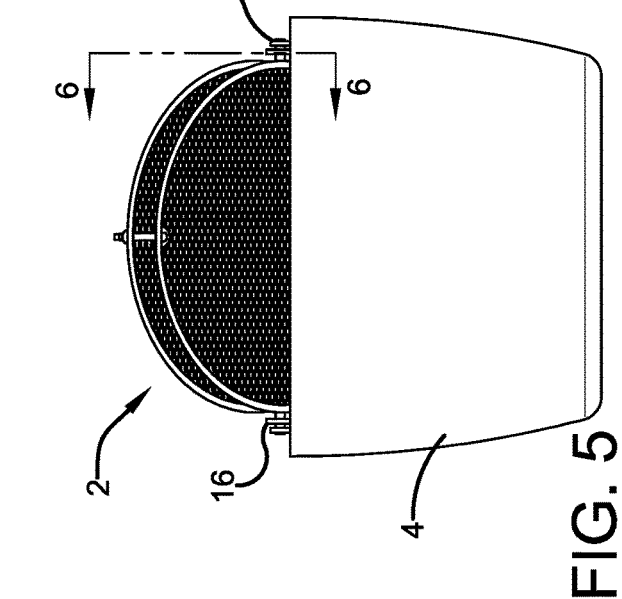

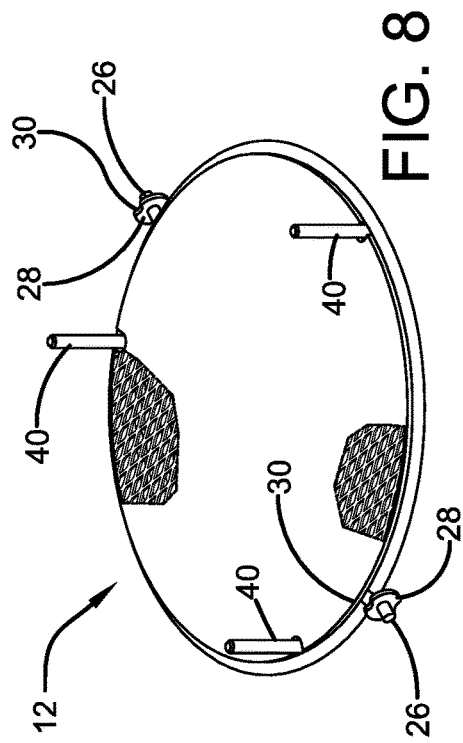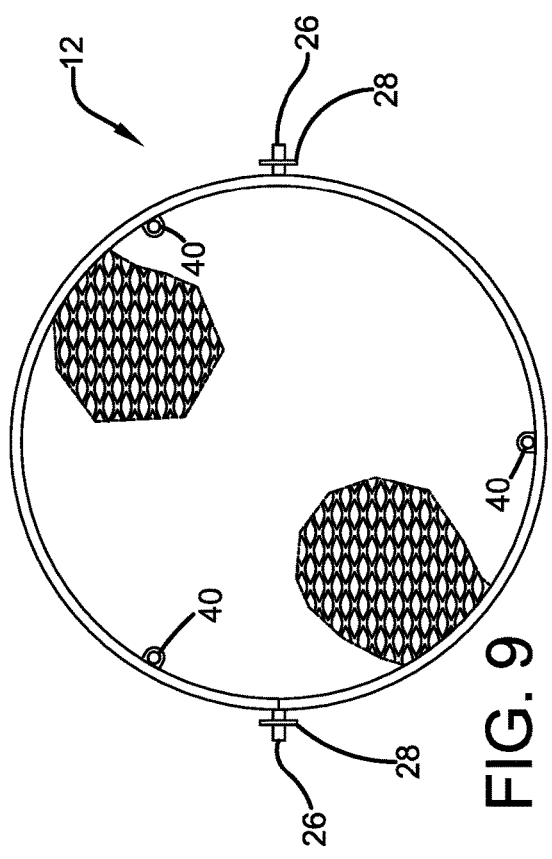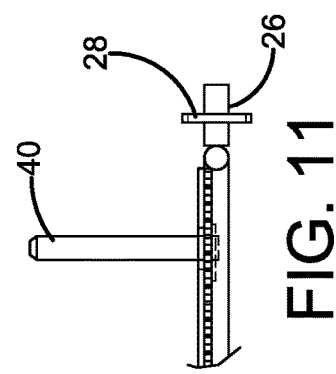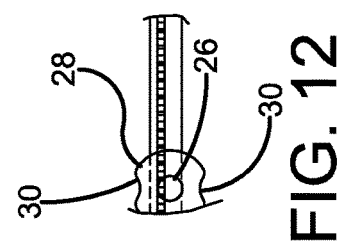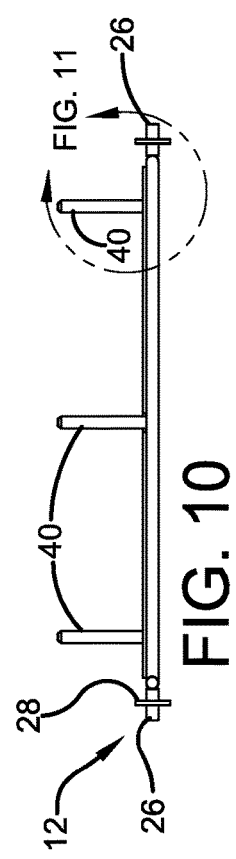

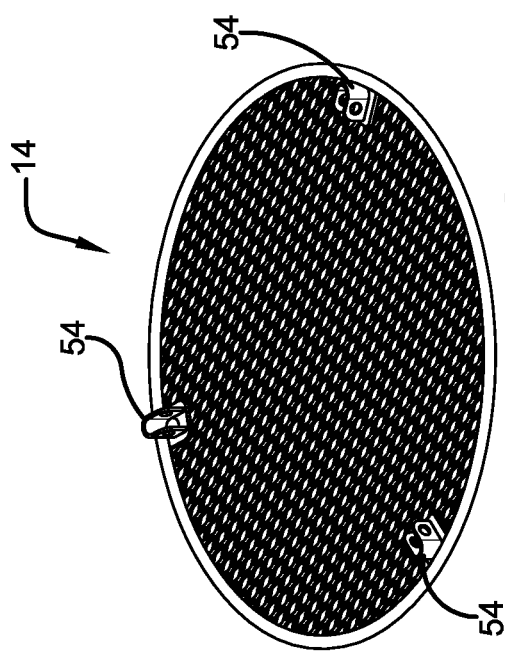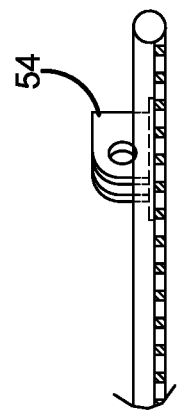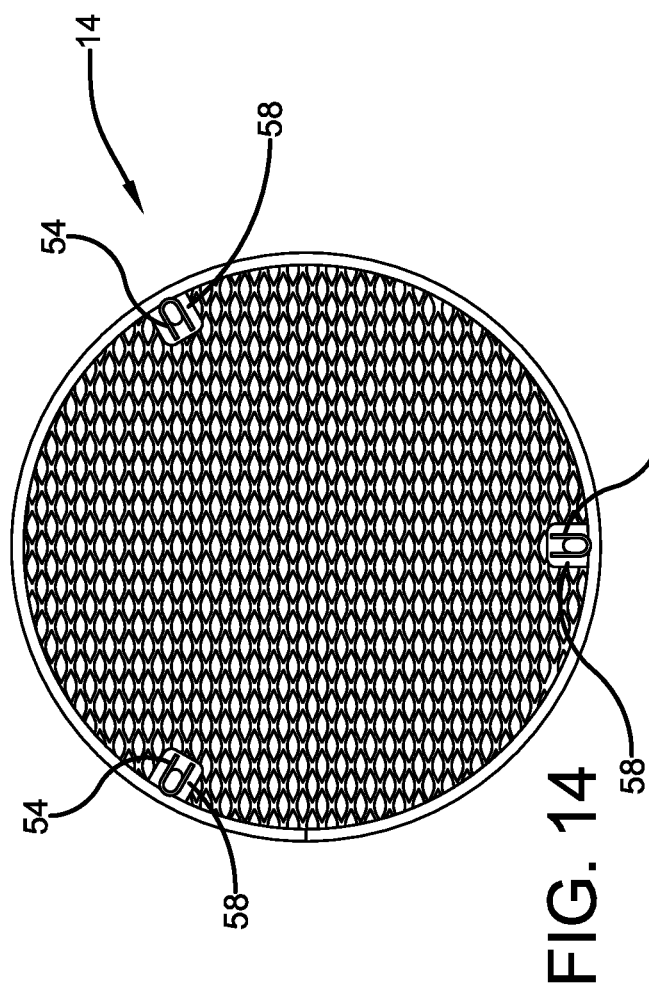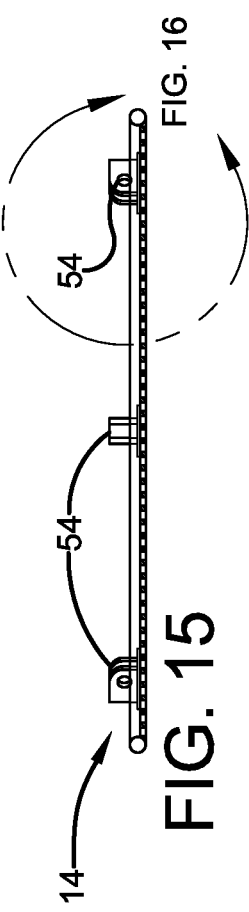

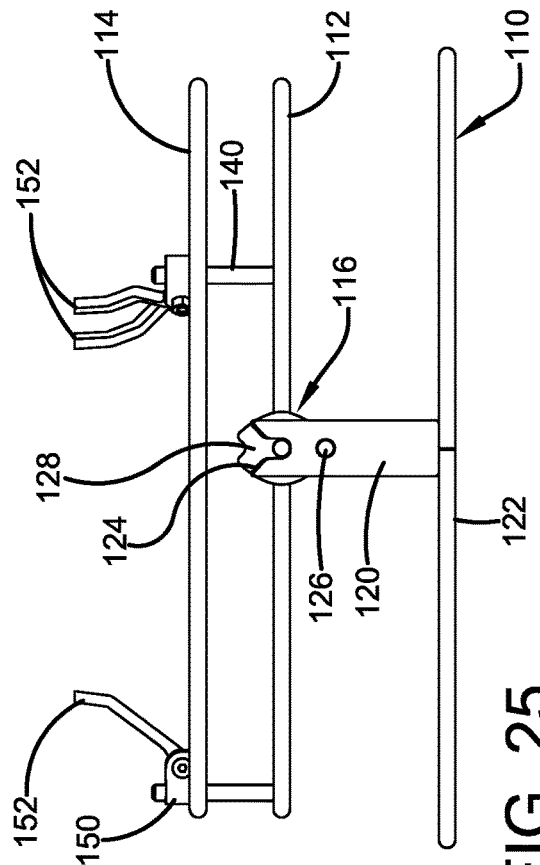
FIG. 25
FIG. 24
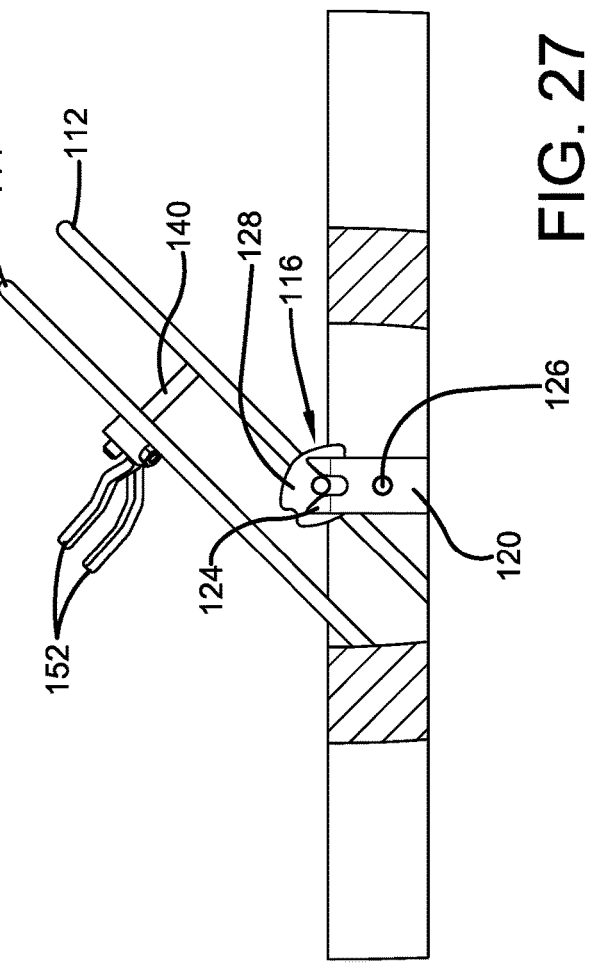
FIG. 27
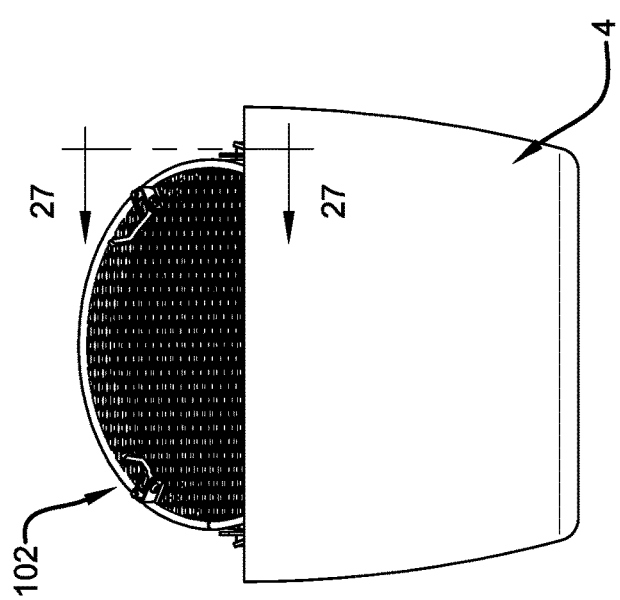
FIG. 26

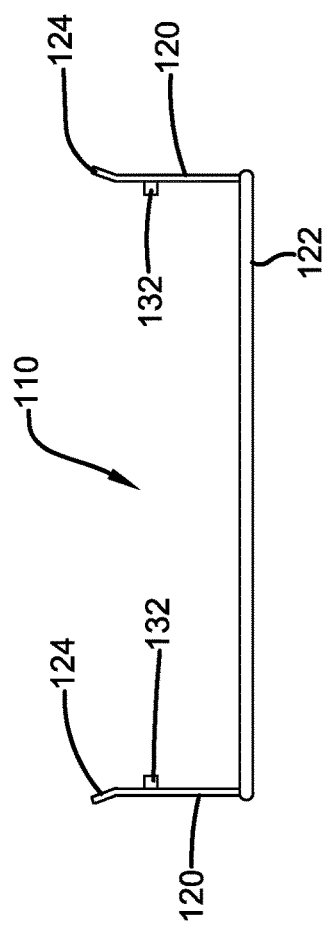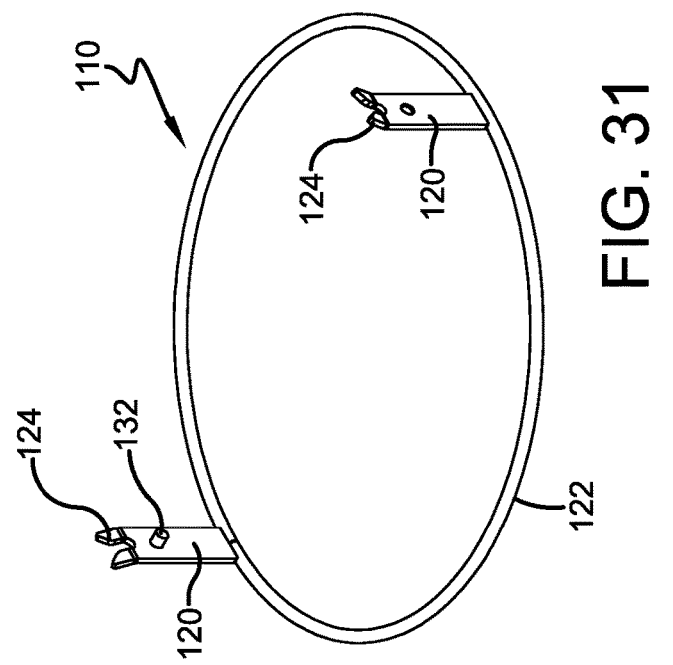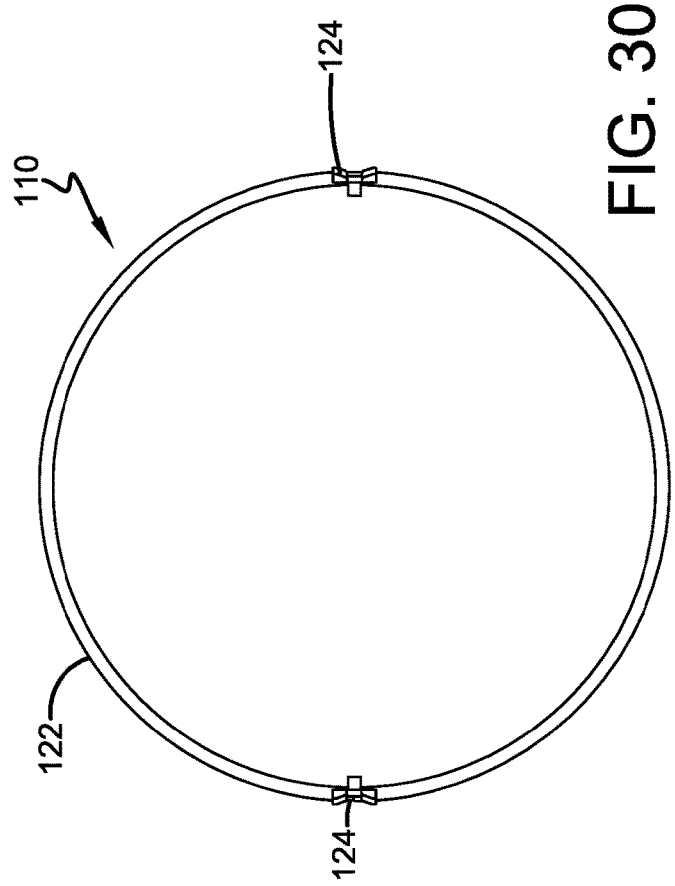

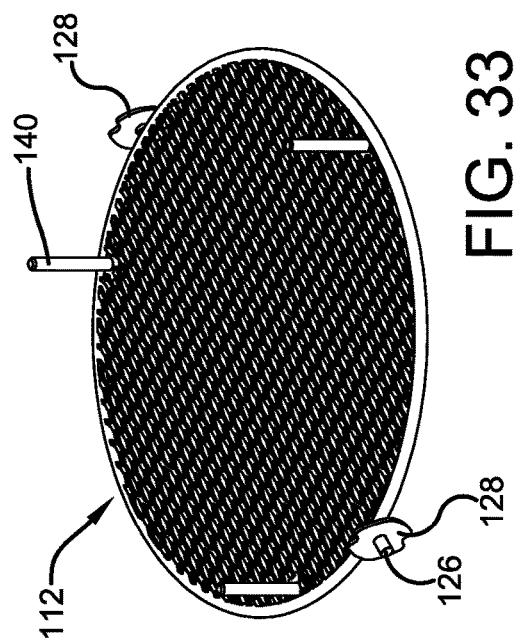
FIG. 33
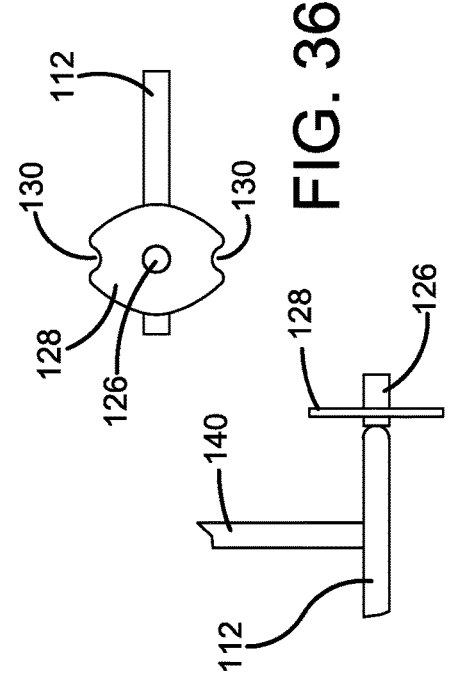
FIG. 36
FIG. 35
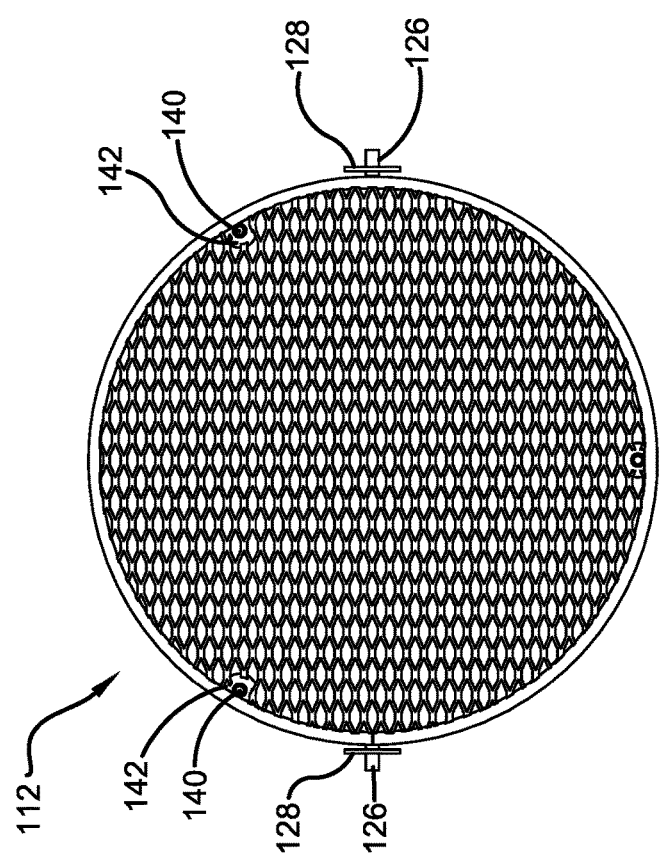
FIG. 32
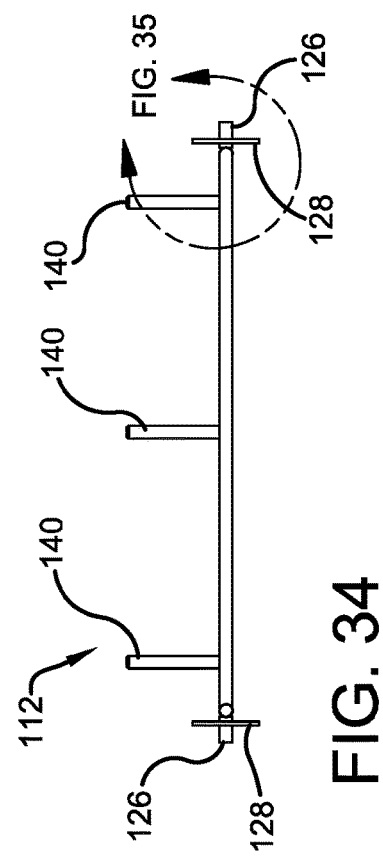
FIG. 34

US 11,206,947 B1

GRILL ASSEMBLY FOR COOKER

CROSS REFERENCE TO RELATED APPLICATIONS

This application claims the benefit of U.S. Provisional Patent Application No. 62/681,765 filed Jun. 7, 2018; the disclosures of which are incorporated herein by reference.

BACKGROUND OF THE DISCLOSURE

1. Technical Field

The disclosure relates to grilling equipment for food and, more particularly, to a grill assembly that holds the food to be grilled and that can be selectively rotated at least 180 degrees. Specifically, the disclosure relates to a grill assembly that is disposed within and can be rotated within a kamado-style ceramic charcoal barbecue cooker.

2. Background Information

Kamado-style ceramic charcoal barbecue cookers have been long used in the United States but have recently increased in popularity in the United States with the increase of outdoor cooking, smoking, and grilling. Many of the popular kamado-style cookers include a rounded lower firebox above which a grill is carried. A dome-shaped lid closes the cooker. The cooker can include vents to regulate the heat and smoke used to cook the food carried on the grill.

Once one has heated the cooker and regulated the internal temperature, it is undesirable to open the lid to release heat and moisture. When one is slow cooking or smoking, there is little need to open the lid and rotate the meat. When grilling a large number of items, however, there is a considerable amount of time required to load the meat onto the grill and the meat typically must be flipped over to obtain even cooking. When one opens the lid and takes the time load and then flip multiple items, the heat and moisture escape which is not desired. Some of these kamado-style cookers are large enough to grill 35-40 burgers, 14-16 whole chickens, or 18-20 steaks. Loading and flipping this many items takes an undesirable amount of time because of the loss of heat and moisture from the interior of the cooker.

SUMMARY OF THE DISCLOSURE

The disclosure provides a grill assembly with first and second grills between which items to be cooked can be clamped or held with a compression force. The grill assembly can be selectively placed above the firebox of a kamado-style charcoal barbecue cooker. While in place within the cooker, the grill assembly can be rotated at least 180 degrees to allow both side of the items to be grilled direct access to the heat from the fire box of the cooker. In some configurations, the grill assembly can be rotated 360 degrees in either direction.

The disclosure provides a grill assembly having first and second grills with the position of the second grill being selectively fixable with respect to the first grill. The position can be rapidly adjusted while the assembly is hot and while food is carried by the assembly. The entire assembly can be preloaded with the items to be grilled and quickly added to the cooker. The loaded assembly can be flipped over inside the cooker which allows the user to flip all of the items carried by the assembly with one motion. These two benefits minimize the time the lid of the cooker has to be open during the cooking process.

The disclosure provides a grill assembly that has its own stand that selectively rotatably supports two grills within the cooker. The stand and configuration of the grills allows the two grills to be rotated at least 180 degrees within the cooker. This allows the food being cooked to be rotated quickly thus minimizing heat loss from the cooker.

The disclosure provides a grill assembly wherein the first and second grills can be adjusted down to a zero clearance and are infinitely adjustable between minimum and maximum spacing positions.

The disclosure provides a grill assembly that can be rotated between two horizontal positions 180 degrees apart with the positions being held by a notched positioner cam that holds the horizontal positions of the assembly even when the weight of the food is not evenly distributed across the assembly. The notched positioner cam holds the position of a loaded grill assembly without requiring the user to manipulate a secondary locking or holding element while using the assembly.

The preceding non-limiting aspects of the assembly, as well as others, are more particularly described below. A more complete understanding of the equipment can be obtained by reference to the accompanying drawings, which are not necessarily intended to indicate relative size and dimensions of the assemblies or components thereof—except where designated, which are exemplary dimensions. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIG. 3 is a front view of the cooker of FIG. 1.

FIG. 4 is a section view taken along line 4-4 of FIG. 3

FIG. 5 is a front view similar to FIG. 3 showing the grill assembly rotated about 45 degrees with respect to the cooker.

FIG. 6 is a section view taken along line 6-6 of FIG. 5.

FIG. 8 is a perspective view of the first grill with three adjuster rods of the spacer assemblies projecting upwardly.

FIG. 9 is a top plan view of FIG. 8.

FIG. 10 is a front elevation view of FIG. 8.

FIG. 11 is an enlarged view of the encircled portion of FIG. 10.

FIG. 12 is a side view of FIG. 11.

FIG. 13 is a perspective view of the second grill with three lock supports of the spacer assemblies projecting upwardly.

FIG. 14 is a top plan view of FIG. 13.

FIG. 15 is a front elevation view of FIG. 13.

FIG. 16 is an enlarged view of the encircled portion of FIG. 15.

FIG. 24 is a front elevation view of the grill assembly of FIG. 22.

FIG. 25 is a side elevation view of the grill assembly of FIG. 22.

FIG. 26 is a front view of the assembly of FIG. 21 showing the grill assembly rotated about 45 degrees with respect to the cooker.

FIG. 27 is a section view taken along line 27-27 of FIG. 26.

FIG. 29 is a front elevation of the base from the grill assembly of FIG. 21.

FIG. 30 is a top plan view of FIG. 29.

FIG. 31 is a perspective view of FIG. 29.

FIG. 32 is a top plan view of the first grill from the grill assembly of FIG. 21.

FIG. 33 is a perspective view of FIG. 32.

FIG. 34 is a front elevation view of FIG. 32.

FIG. 35 is an enlarged view of the encircled portion of FIG. 34.

FIG. 36 is a side view of FIG. 35.

DETAILED DESCRIPTION OF THE DISCLOSURE

Figure 1:
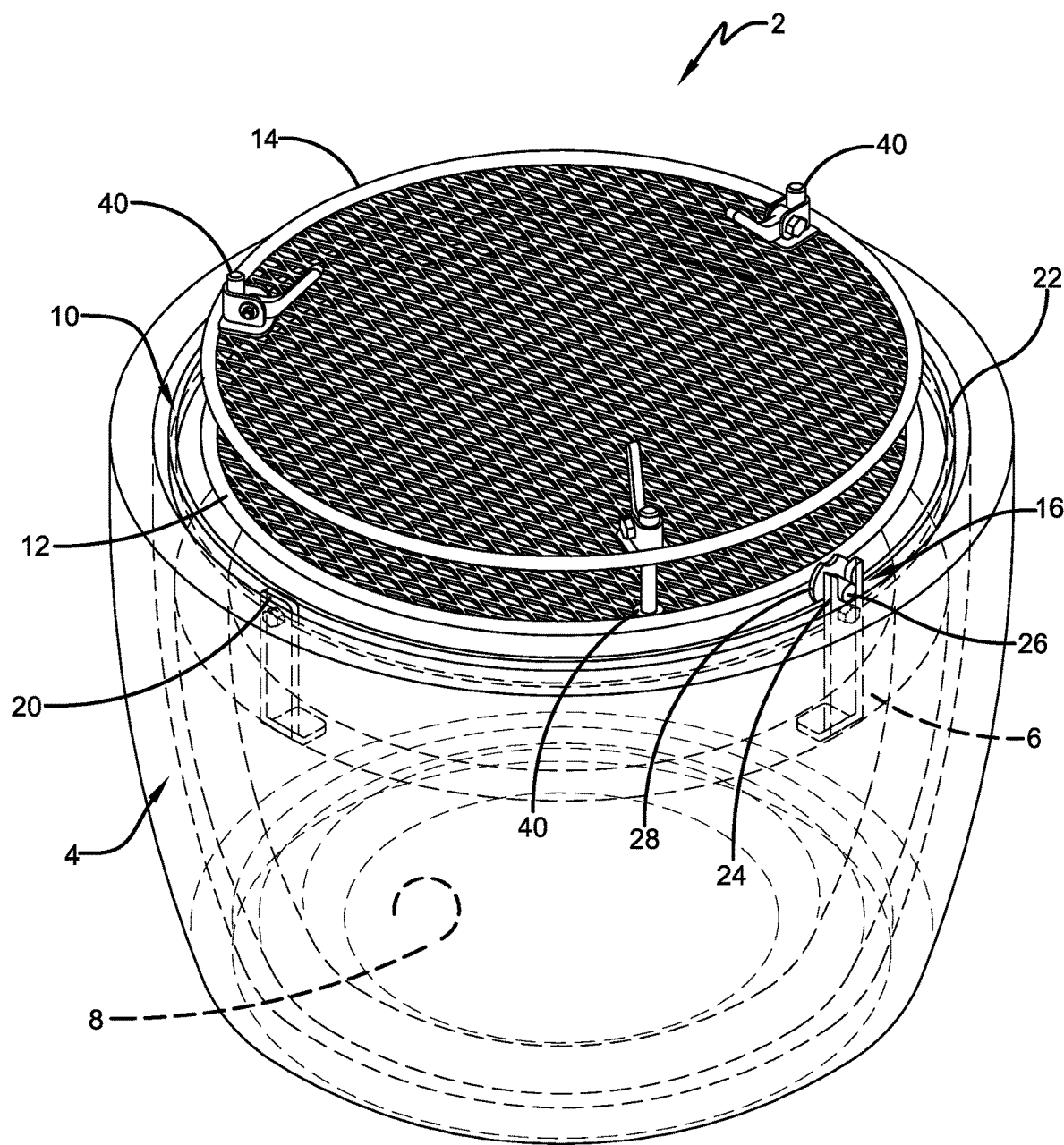
FIG. 1 is a perspective view of the lower portion of a kamado-style cooker with the grill assembly of the disclosure installed in its first horizontal position.
Figure 2:
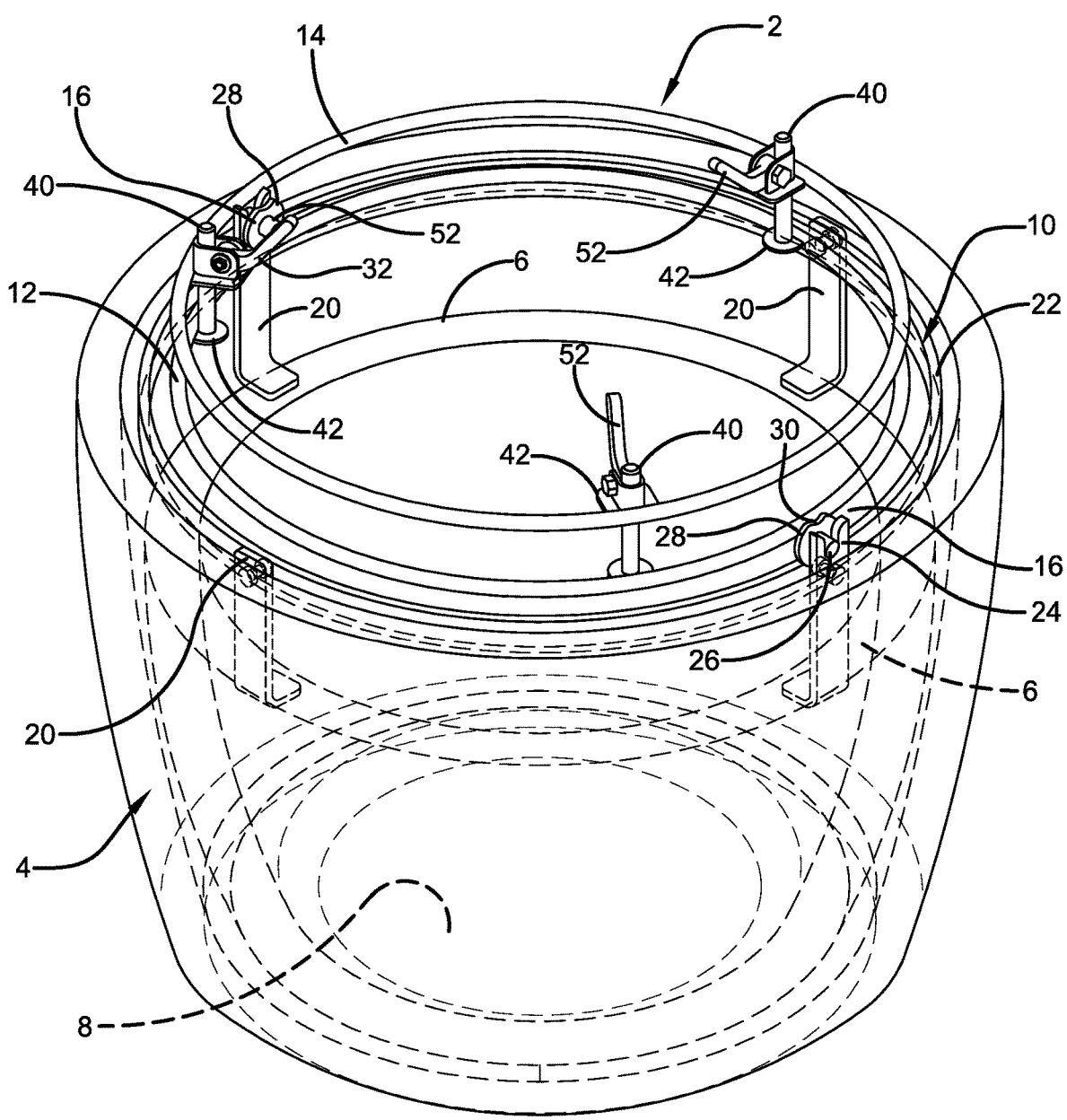
FIG. 2 is a view similar to FIG. 1 with the grating of the first and second grills removed for clarity.

A first exemplary configuration of the grill assembly of the disclosure is indicated generally by the reference numeral 2 in the accompanying drawings. A second exemplary configuration is indicated generally by the reference numeral 102. The two configurations have similar elements and similar operations. Grill assemblies 2 and 102 are used with a cooker 4 such as the kamado-style cooker depicted in FIGS. 1, 2, 3, 5, 21, and 26. Cooker 4 includes a lid that pivots from a closed position to an open position with grill assemblies 2 and 102 being entirely contained within cooker 4 when the lid is closed. The exemplary grill assemblies 2 and 102 are round when viewed from above to match the round shape of the space above the firebox of cooker 4. Grill assembly 2 is provided in different diameters for different-sized cookers. Grill assembly 2 also can be provided in an oval configuration for oval-shaped cookers and other shapes as needed to match the shape of the firebox in other cookers. In the oval configuration, the grill assembly rotates about is elongated axis. Each grill assembly 2 and 102 is carried by cooker 4 on an inwardly-projecting ledge or shelf 6 or directly on a top wall of firebox 8 of cooker 4.

The first configuration of grill assembly 2 includes a base 10 that engages cooker 4 to substantially center assembly 2 above firebox 8 and to allow selective rotation of at least 180 degrees of the first and second grills 12 and 14 of assembly 2. In the exemplary configuration, first and second grills 12 and 14 can be selectively rotated 360 degrees with respect to base 10 and cooker 4 in either a clockwise or counterclockwise direction. A minimum rotation of 180 degrees in one direction is desired. Assembly 2 includes at least one retaining assembly 16 that establishes at least the two horizontal positions of first and second grills 12 and 14. Once first and second grills 12 and 14 are registered in one of the two horizontal positions by retaining assembly 16, a force must be applied to first and second grills 12 and 14 to selectively rotate them out of the registered horizontal position. The force is typically applied by the person operating the grill and cooking the food. The retaining force provided by retaining assembly 16 can be varied by altering the geometry of assembly 16 but is sufficient to hold first and second grills 12 and 14 in the registered horizontal position when first and second grills 12 and 14 are unevenly loaded with items to be cooked. Grill assembly 2 is configured to allow first and second grills 12 and 14 to be readily removed from base 10 to allow food to be loaded between first grill 12 and second grill 14. In this configuration, first and second grills 12 and 14 can be lifted from base 10 without any initial unlocking steps. Grill assembly 2 provides that the spacing of first and second grills 12 and 14 can be adjusted to clamp food between grills 12 and 14. Grill assembly 2 also provides that the loaded grills 12 and 14 can be quickly installed onto base 10 in one of the registered horizontal positions. This allows food to be added to cooker 4 while minimizing the time the lid of cooker 4 is open. Grill assembly 2 further provides that it can be quickly rotated 180 degrees from one registered horizontal position to its second registered horizontal position while minimizing the amount of time the lid of cooker 4 is open. This allows all of the food carried by assembly 2 to be quickly flipped over with respect to cooker 4.

As described above, base 10 supports assembly 2 from a portion of cooker 4. In the first exemplary configuration, at least three supports 20 extend down from a base ring 22. Two oppositely-disposed supports 20 define cradle ends 24 for pivotably receiving first grill 12. In this configuration, two additional supports 20 without cradle ends are provided for additional stability. In this configuration, base ring 22 is provided to allow all supports 20 to be installed at the same time and to provide the proper position for supports 20 without the need for the user to individually place supports 20 at the proper locations within cooker 4. As shown in FIGS. 3 and 4, supports 20 locate base ring 22 roughly even with or just above the top of the lower portion of cooker 4 where the lid of the cooker closes on the base of cooker 4. Supports 20 are sized to locate cradle ends 24 above the lower base of cooker 4 so that one placing first and second grills 12 and 14 onto base 10 can see and readily install first and second grills 12 and 14. Each cradle end 24 provides a slot open through the top end of support 20. The lower end of slot defines a rounded cradle that receives a pivot pin 26 projecting from first grill 12.

Pivot pins 26 project from opposite sides of first grill 12. Each pivot pin 26 carries a notched positioner cam 28 which is a first portion of retaining assembly 16. Positioner cam 28 rotates with pivot pin 26 and can be welded to pivot pin 26. Each positioner cam 28 defines two concave recesses or notches 30 disposed on opposite sides of positioner cam 28. Lock projection 32 is disposed below cradle end 24 and on the inside of base ring 22 where it is disposed to be engaged by positioner cam 28. Lock projection 32 can be a protuberance, a pin, a rod, a nut, a bolt end, or other equivalent structure that is received in notches 30. Notches 30 are located such that one notch 30 receives its corresponding lock projection 32 when grill 12 is horizontal to define the registered positions of grills 12 and 14. FIG. 4 depicts one of the two registered positions. In this position, the weight of grill assembly 2 pushes positioner cam 28 down against lock projection 32 where lock projection 32 is firmly seated in notch 30. Notches 30 are deep enough and shaped to hold a fully-loaded grill assembly 2 in the horizontal position (the registered position). When grill assembly 2 is rotated, the initial force applied to grills 12 and 14 causes positioner cam 28 to ride up on lock projection 32 like a cam follower riding on a cam. The combined weight of the loaded grills 12 and 14 and the shape of notch 30 requires a significant amount of force to move positioner cam 28 up and over lock projection 32. Once notch 30 is free of lock projection 32, rotation of grill assembly 2 is smooth and easy when it is evenly loaded. This rotating motion continues through the rotation to the other registered position wherein the other notch 30 drops down onto lock projection 32. FIG. 6 shows grills 12 and 14 between registered positions. In the exemplary configuration, lock projection 32 is a part of the connector that secures support 20 to base ring 22. Lock projections 32 are the second portion of retaining assembly 16. In other configurations, other structures can be used to establish the registered positions of grills 12 and 14. For example, the positions of notches 30 and lock projections 32 can be reversed. Also in other configurations, cradle ends 24 can be provided independent of supports 20 to receive pivot pins 26 and a protuberance can be provided that extends inwardly from base ring 22 at the location needed to be engaged by positioner cam 28.

First grill 12 includes an outer ring with a grill grate disposed at least flush with the upper surface of the outer ring. The grill grate can be provided in a variety of patterns and can be provided in a variety of materials. Openings from a quarter inch to three-quarters inch can be used. The pattern can be such as those depicted in FIGS. 1 and 14. A plurality of adjuster rods 40 project upwardly from first grill 12. Second grill 14 slides along and is locked to adjuster rods 40. The length of adjuster rods 40 above the grill grate of first grill 12 defines the amount of adjustment is available for second grill 14. In the exemplary configuration, each adjuster rod 40 is about three inches long. Each adjuster rod 40 is connected to a support plate 42 that projects inwardly from the outer ring.

Figure 7:
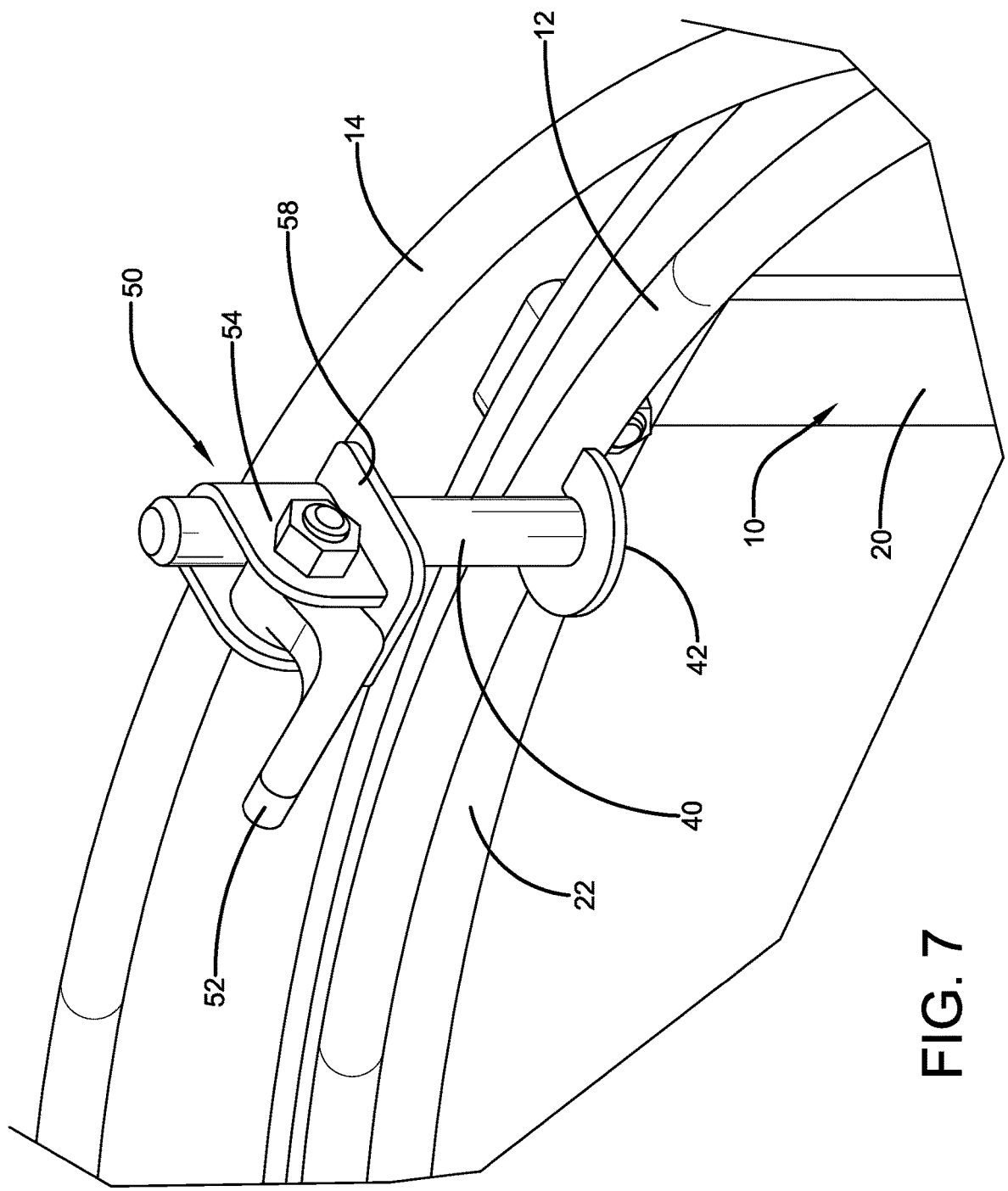
FIG. 7 is a perspective view of one of the spacer assemblies that connect the first and second grills (shown with gratings removed for clarity).
Figure 19:
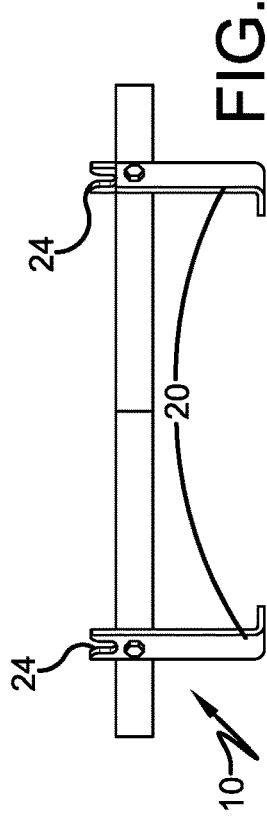
FIG. 19 is an elevation view of the base.
Figure 17:
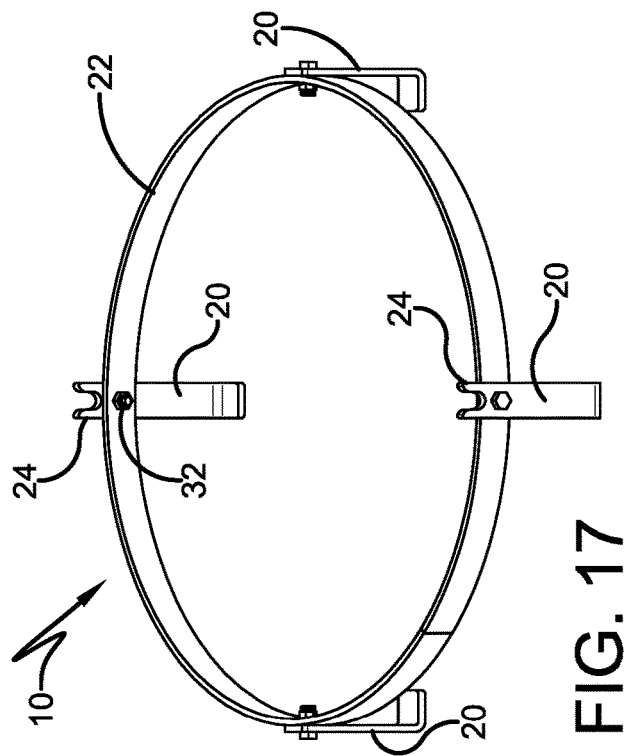
FIG. 17 is a perspective view of the base that mounts the grills within the cooker.
Figure 18:
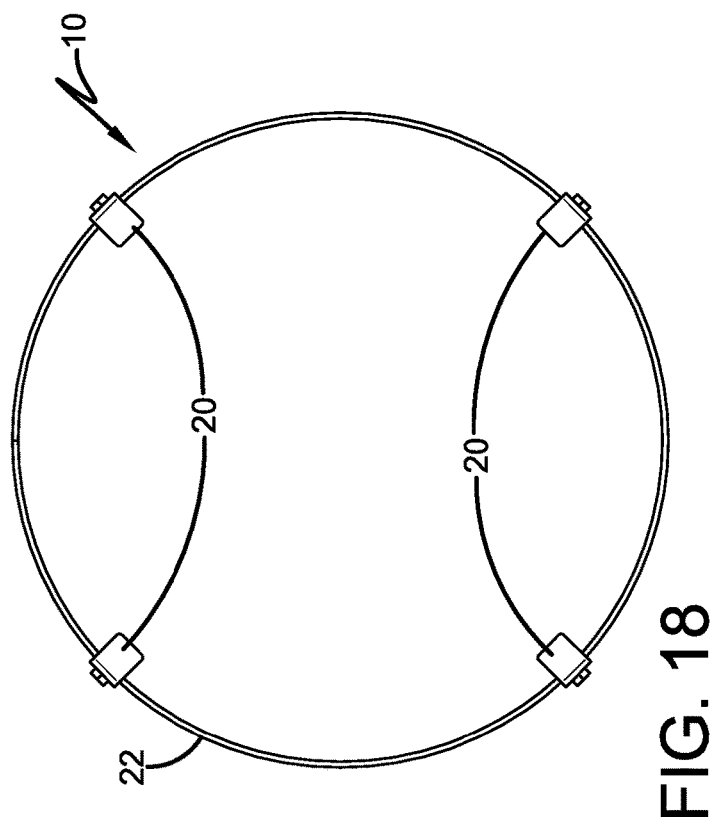
FIG. 18 is a bottom plan view of the base.
Figure 20:
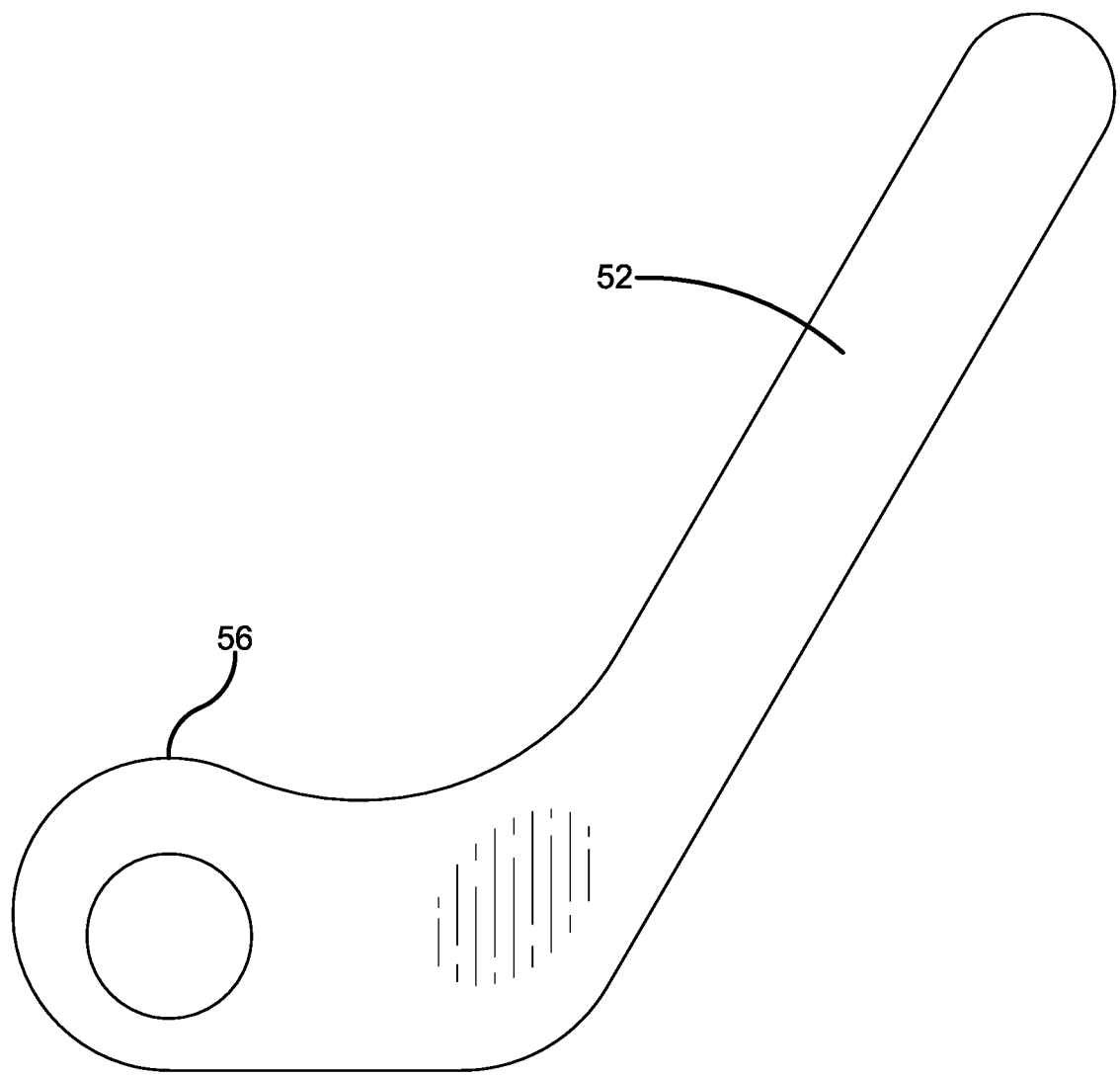
FIG. 20 is a side view of a cam lock handle.
Figure 22:
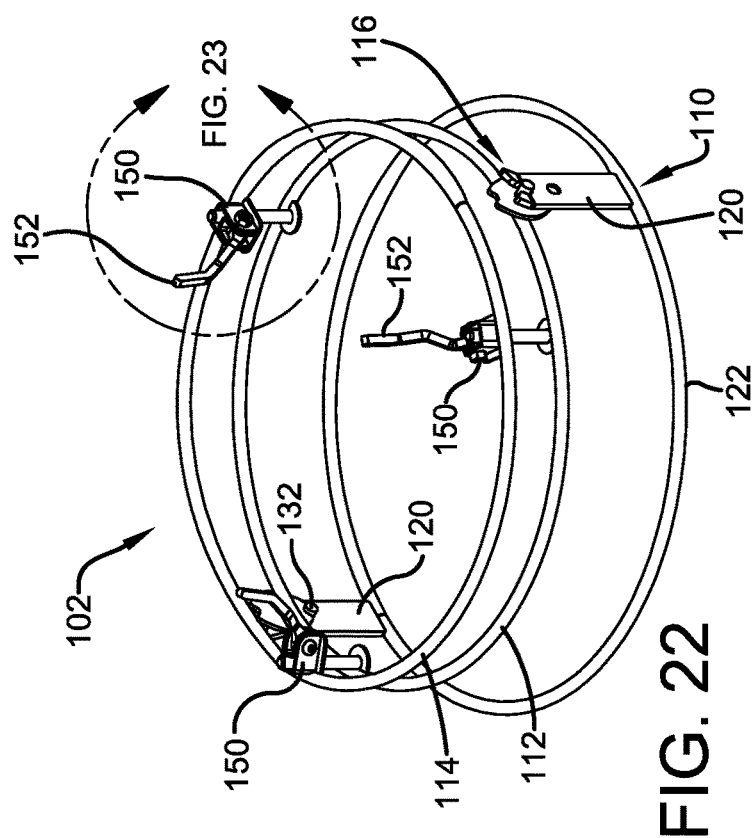
FIG. 22 is a perspective view of the grill assembly (gratings removed for clarity).

Second grill 14 includes an outer ring with a grill grate disposed at least flush with its lower surface. Grates are disposed at least flush so that the grates can touch each other when the grills are empty. As above, the grill grate can be provided in a variety of patterns and can be provided in a variety of materials. Openings from a quarter inch to three-quarters inch can be used. The pattern can be such as those depicted in FIGS. 1 and 14. At locations that align with adjuster rods, second grill 14 includes a lock assembly 50 that selectively locks the position of second grill 14 with respect to adjuster rod 40. Each lock assembly includes a selectively pivotable cam lock handle 52 that is pivotable between an unlocked position where second grill 14 can slide along adjuster rod 40 and a locked position. Cam lock handle is carried on a handle pivot pin that extends between two walls of a lock mount plate 54 (see FIG. 7). The inner end of cam lock handle 52 has an enlarged portion 56 (see FIG. 20) that, when handle is rotated upwardly and outwardly, engages adjuster rod 40 and clamps lock assembly 50 to adjuster rod 40. These ends of cam lock handles 52 function as cam locks with adjuster rods 40. Each lock mount plate 54 is disposed on a lock support plate 58 that defines a slot through which adjuster rod 40 passes when second grill 14 is disposed on first grill 12.

Assembly 2 can be provided with an optional stand similar to base 10 that supports first grill 12 when first grill 12 is removed from cooker 4. The user can place first grill 12 on the stand and load the food to be cooked onto first grill 12. The user then places second grill 14 onto adjuster rods 40 and presses down to clamp the food between first grill 12 and second grill 14. The user then rotates cam lock handles 52 to their locked positions. The user can then open cooker 4 and place first and second grills 12 and 14 along with the food onto base 10 (which is already inside cooker 4) and quickly close the lid of cooker 4. When the food needs to be flipped over, the user opens the lid of cooker 4 and rotates grills 12 and 14 from the first registered position to the second registered position. This can be performed quickly. The user then closes the lid of cooker 4 with a minimum of heat and moisture escaping from cooker 4. When the food is cooked, the user opens cooker 4 and removes grills 12 and 14 and places the assembly on the stand where cam lock handles are moved to the unlocked positions. Second grill 14 is then removed and the food can be removed from first grill 12.

The second configuration of grill assembly 102 includes a base 110 that engages cooker 4 to substantially center assembly 102 above firebox 8 and to allow selective rotation of at least 180 degrees of the first and second grills 112 and 114 of assembly 102. In the exemplary configuration, first and second grills 112 and 114 can be selectively rotated 360 degrees with respect to base 110 and cooker 4 in either a clockwise or counterclockwise direction. A minimum rotation of 180 degrees in one direction is desired. Assembly 102 includes at least one retaining assembly that establishes at least the two horizontal positions of first and second grills 112 and 114. Once first and second grills 112 and 114 are registered in one of the two horizontal positions by a retaining assembly 116, a force must be applied to first and second grills 112 and 114 to rotate them out of the registered horizontal position. The force required to selectively rotate the grills typically is delivered by the person operating the grill. The retaining force provided by retaining assembly 116 can be varied by altering the geometry of assembly 116 but is sufficient to hold first and second grills 112 and 114 in the registered horizontal position when first and second grills 112 and 114 are unevenly loaded with items to be cooked. One or two retaining assemblies 116 can be used. Grill assembly 102 is configured to allow first and second grills 112 and 114 to be readily removed from base 110 to allow food to be loaded between first grill 112 and second grill 114. In this configuration, first and second grills 112 and 114 can be lifted from base 110 without any initial unlocking steps. Grill assembly 102 provides that the spacing of first and second grills 112 and 114 can be adjusted to clamp food between grills 112 and 114. Grill assembly 102 also provides that the loaded grills 112 and 114 can be quickly installed onto base 110 in one of the registered horizontal positions. This allows food to be added to cooker 4 while minimizing the time the lid of cooker 4 is open. Grill assembly 102 further provides that it can be quickly rotated 180 degrees from one registered horizontal position to its second registered horizontal position while minimizing the amount of time the lid of cooker 4 is open. This allows all of the food carried by assembly 102 to be quickly flipped over with respect to cooker 4.

Figure 21:
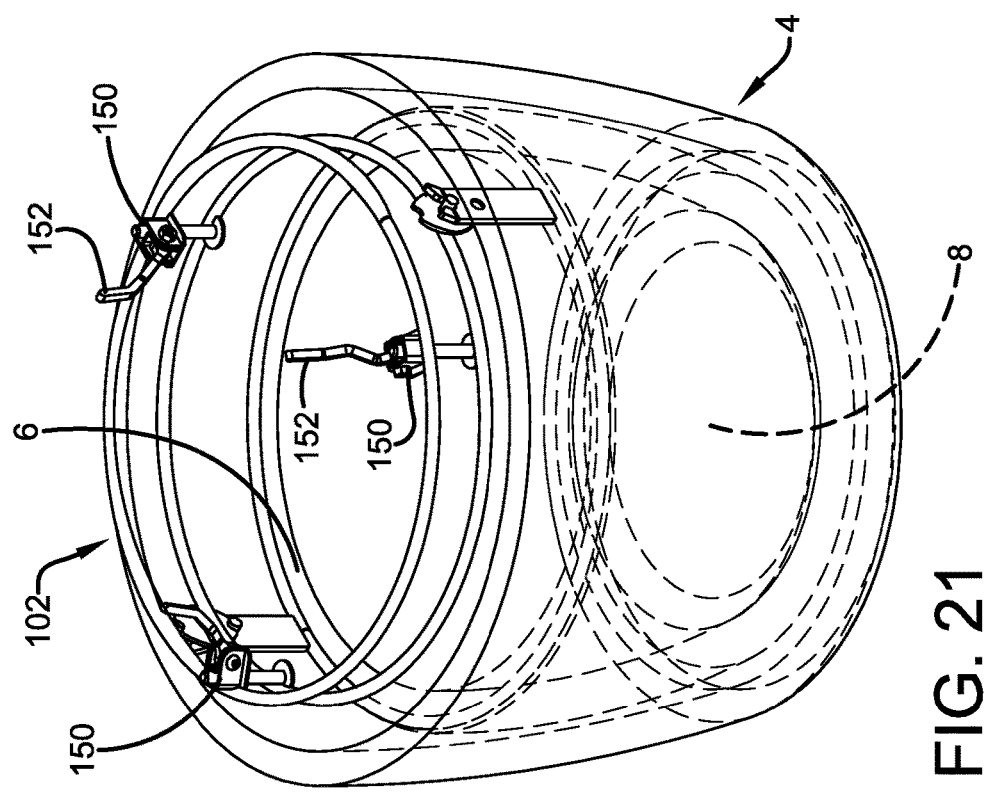
FIG. 21 is a perspective view of the lower portion of a kamado-style cooker with another configuration of the grill assembly of the disclosure installed in its first horizontal position (gratings removed for clarity).

As described above, base 110 supports assembly 102 from a portion of cooker 4. In the second exemplary configuration, at least two supports 120 extend up from a base ring 122 at opposite positions on base ring 122. Supports 120 define cradle ends 124 for pivotably receiving first grill 112. In this configuration, additional supports without cradle ends can be provided for additional stability but they must be moved when rotating grills 112 and 114. Base ring 122 is provided to allow all supports 120 to be installed at the same time and to provide the proper position for supports 120 without the need for the user to individually place supports 120 at the proper locations within cooker 4. As shown in FIGS. 21 and 27, supports 120 locate first grill 112 just above the top of the lower portion of cooker 4 where the lid of the cooker closes on the base of cooker 4. Supports 120 are sized to locate cradle ends 124 above the lower base of cooker 4 so that one placing first and second grills 112 and 114 onto base 110 can see and readily install first and second grills 112 and 114. Each cradle end 124 provides a slot open through the top end of support 120. The lower end of slot defines a rounded cradle that receives a pivot pin 126 projecting from first grill 112. The slotted cradle ends 124 can be angled outwardly to make loading grills 112 and 114 easier.

Pivot pins 126 project from opposite sides of first grill 112. At least one pivot pin 126 carries a notched positioner cam 128 which is a first portion of retaining assembly 116. In the exemplary configuration, a notched positioner cam 128 is carried by each pivot pin 126. Positioner cam 128 rotates with pivot pin 126 and can be welded to pivot pin 126. Each positioner cam 128 defines two concave recesses or notches 130 disposed on opposite sides of positioner cam 128. Lock projection 132 is disposed below cradle end 124 and on the inside of supports 120 where it is disposed to be engaged by positioner cam 128. Lock projection 132 can be a protuberance, a pin, a rod, a nut, a bolt end, or other equivalent structure that is received in notches 130. Notches 130 are located such that one notch 130 receives its corresponding lock projection 132 when grills 112 and 114 are horizontal to define the registered positions of grills 112 and 114. FIG. 25 depicts one of the two registered positions. In this position, the weight of grill assembly 102 pushes positioner cams 128 down against lock projections 132 where lock projections 32 are firmly seated in notches 130. Notches 130 are deep enough and shaped to hold a fully-loaded grill assembly 102 in the horizontal position (the registered position) even when unevenly loaded. In the exemplary configuration, grill assembly will remain in its horizontal positions when up to four pounds of food are loaded on side of the centerline of grills 112 and 114. When grill assembly 102 is rotated, the initial force applied to grills 112 and 114 causes positioner cam 128 to ride up on its lock projection 132 like a cam follower riding on a cam. The combined weight of the loaded grills 112 and 114 and the shape of notch 130 requires a significant amount of force to move positioner cam 128 up and over lock projection 132. Once notch 130 is free of lock projection 132, rotation of grill assembly 102 is smooth and easy when it is evenly loaded. This rotating motion continues through the rotation to the other registered position wherein the other notch 130 drops down onto lock projection 132. FIG. 27 shows grills 112 and 114 between registered positions. In this exemplary configuration, lock projection 132 is welded to, press fit into, or threaded into support 120. Lock projections 132 are the second portion of retaining assembly 116. In other configurations, other structures can be used to establish the registered positions of grills 112 and 114. For example, the positions of notches 130 and lock projections 132 can be reversed.

Positioner cam 128 is generally elongated. Positioner cam 128 has two smoothly rounded peaks disposed on opposite sides of each notch 130 such that cam 128 one of the smoothly rounded peaks must be forced up and over lock projection 132 when grills 112 and 114 are initially rotated. The longitudinal distance between the smoothly rounded peaks one end of cam 128 to the smoothly rounded peaks on the other end of cam 128 is longer than the width of positioner cam 128. The edge-to-edge lateral width is, however, about the same as the longitudinal distance from the bottom of one notch 130 to the bottom of the opposite notch 130.

Figure 28:
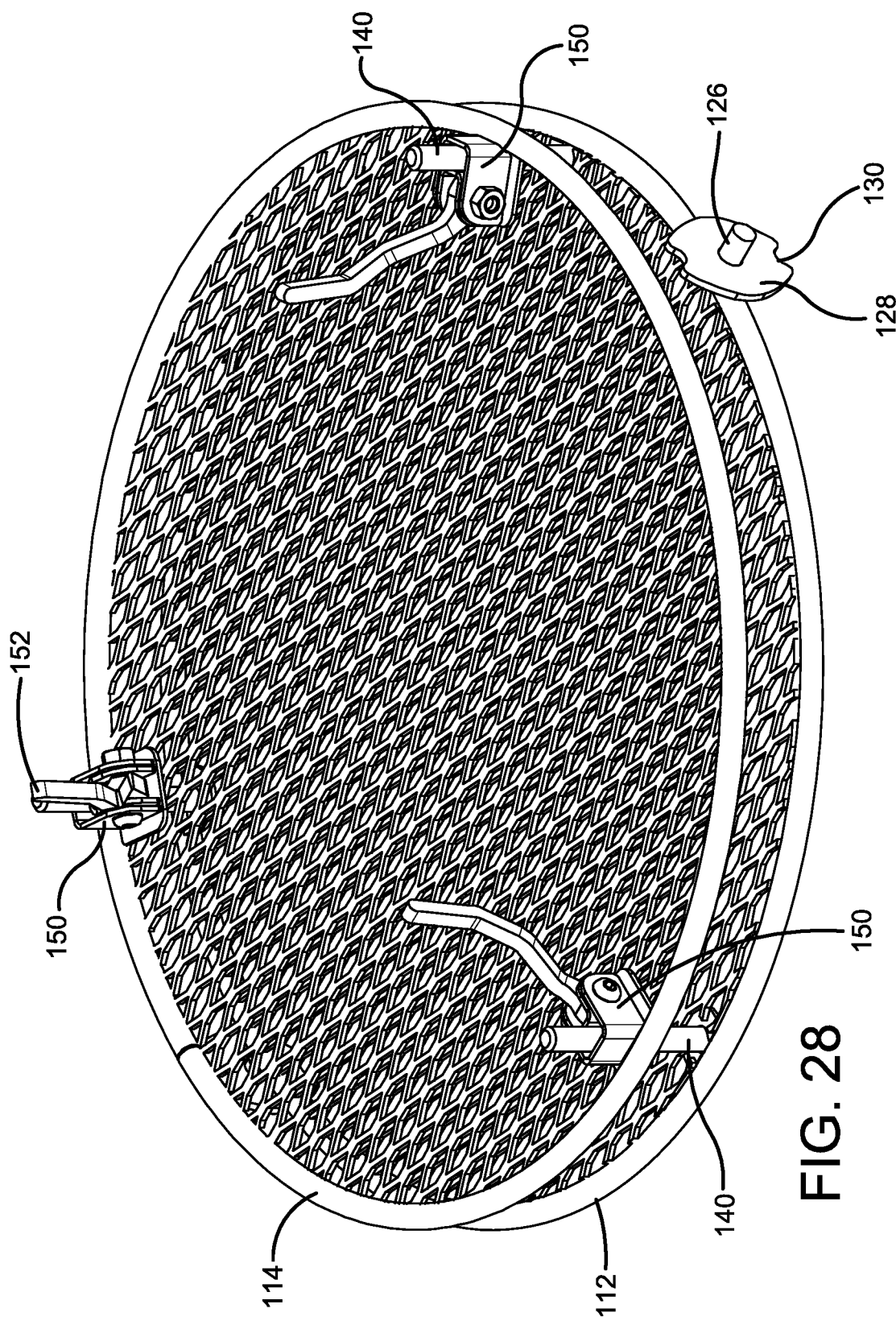
FIG. 28 is a perspective view of the first and second grills held together by three lock assemblies.
Figure 38:
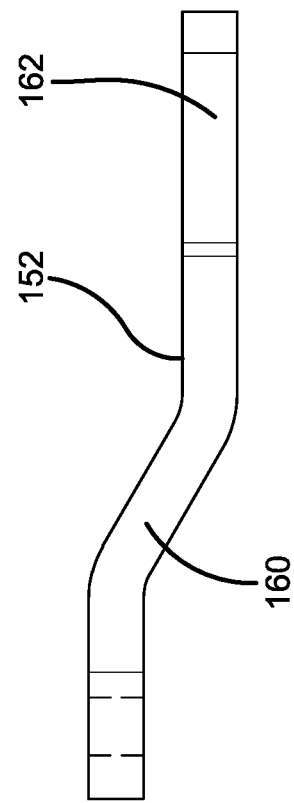
FIG. 38 is a top plan view of FIG. 37.

First grill 112 includes an outer ring with a grill grate disposed at least flush with the upper surface of the outer ring. The grill grate can be provided in a variety of patterns and can be provided in a variety of materials. Openings from a quarter inch to three-quarters inch can be used. The pattern can be such as the one depicted in FIG. 28. A plurality of adjuster rods 140 project upwardly from first grill 112. Second grill 114 slides along and is locked to adjuster rods 140. The length of adjuster rods 140 above the grill grate of first grill 112 defines the amount of adjustment is available for second grill 114. In the exemplary configuration, each adjuster rod 140 is about three inches long. Each adjuster rod 140 is connected to a support plate 142 that projects inwardly from the outer ring.

Figure 23:
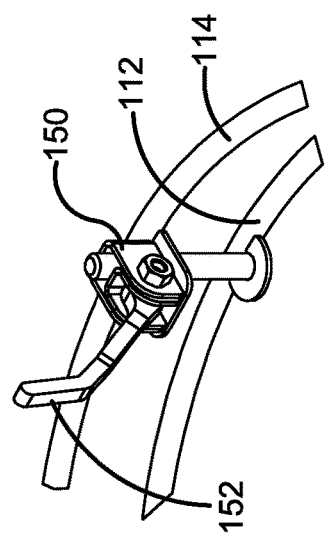
FIG. 23 is an enlarged perspective view of one of the lock assemblies.
Figure 39:
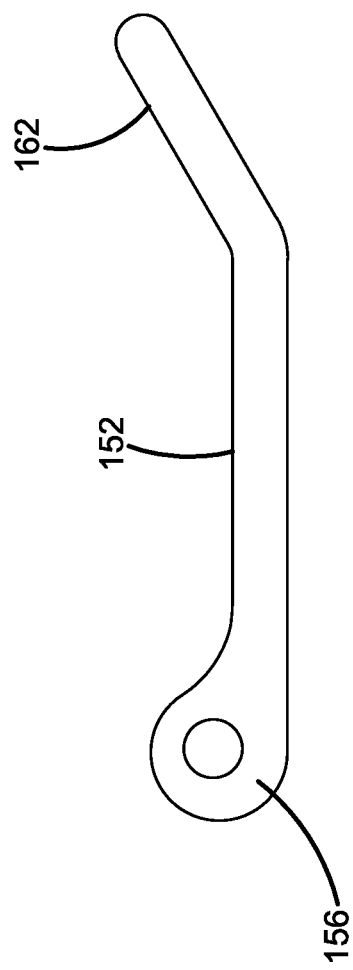
FIG. 39 is a side view of FIG. 37.
Figure 37:
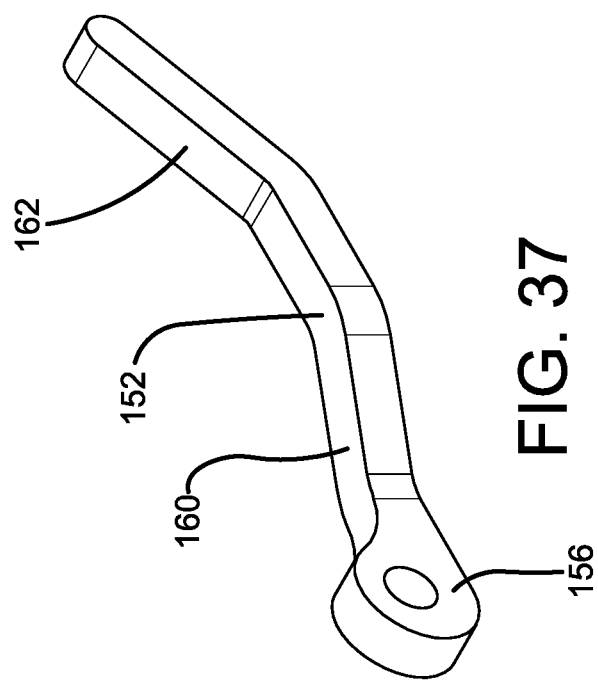
FIG. 37 is a perspective view of a cam lock handle from the grill assembly of FIG. 21.
Figure 40:
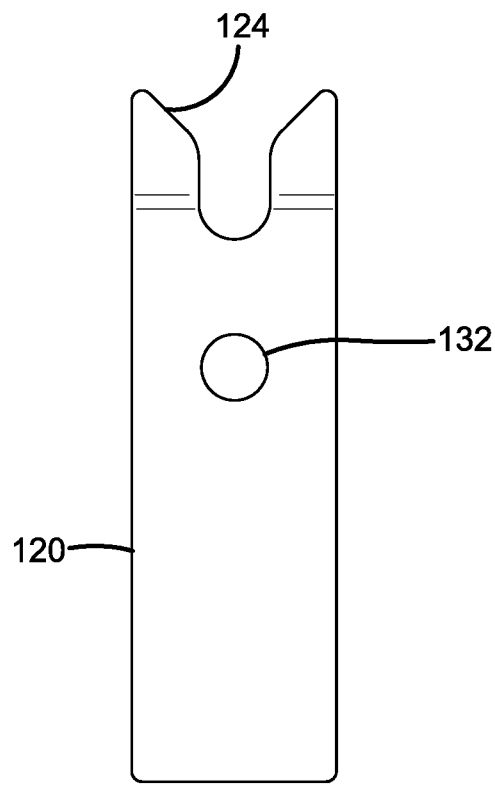
FIG. 40 is front elevation view of a support having a cradle end from the grill assembly of FIG. 21.
Figure 41:
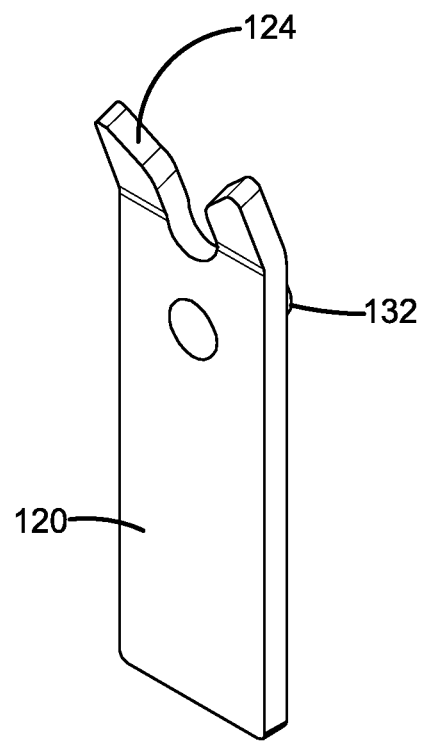
FIG. 41 is a perspective view of FIG. 40.
Figure 42:
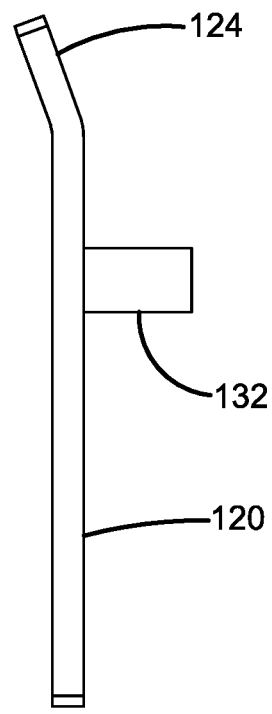
FIG. 42 is a side view of FIG. 40.
Figure 45:
FIG. 45 is a side view of FIG. 43.
Figure 44:
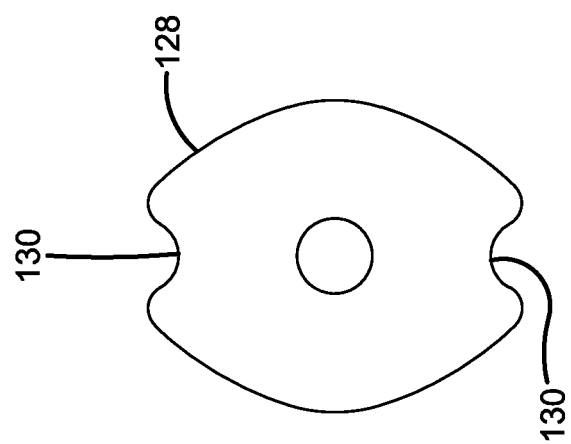
FIG. 44 is a front elevation view of FIG. 43.
Figure 43:
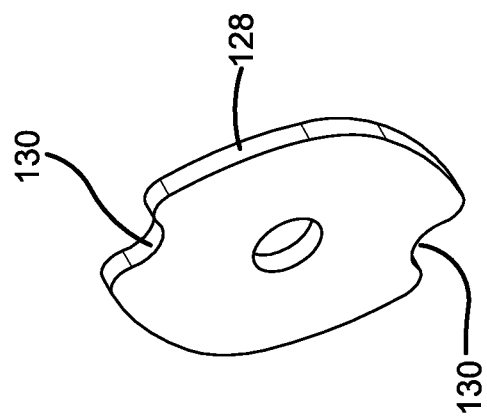
FIG. 43 is a perspective view of a notched positioner cam from the grill assembly of FIG. 21.

Second grill 114 includes an outer ring with a grill grate disposed at least flush with its lower surface. Grates are disposed at least flush so that the grates can touch each other when the grills are empty. As above, the grill grate can be provided in a variety of patterns and can be provided in a variety of materials. Openings from a quarter inch to three-quarters inch can be used. The pattern can be such as the one shown in FIG. 28. At locations that align with adjuster rods, second grill 114 includes a lock assembly 150 that selectively locks the position of second grill 114 with respect to adjuster rod 140. Each lock assembly includes a selectively pivotable cam lock handle 152 that is pivotable between an unlocked position where second grill 114 can slide along adjuster rod 140 and a locked position. Cam lock handle 152 is carried on a handle pivot pin that extends between two walls of a lock mount plate (see FIG. 23). The inner end of cam lock handle 152 has an enlarged portion 156 (see FIG. 39) that, when handle is rotated downwardly and inwardly, engages adjuster rod 140 and clamps lock assembly 150 to adjuster rod 140. These ends of cam lock handles 152 function as cam locks with adjuster rods 140. Each lock mount plate is disposed on a lock support plate that defines a slot through which adjuster rod 140 passes when second grill 114 is disposed on first grill 112.

In the second configuration, each cam lock handle 152 has an offset middle portion 160 that positions the outer portion 162 of handle 152 offset from adjuster rods 140.

Assembly 102 can be provided with an optional stand similar to base 110 that supports first grill 112 when first grill 112 is removed from cooker 4. This stand can include additional supports 120 that engage grill 112 while food is loaded. The user can place first grill 112 on the stand and load the food to be cooked onto first grill 112. The user then places second grill 114 onto adjuster rods 140 and presses down to clamp the food between first grill 112 and second grill 114. The user then rotates cam lock handles 152 to their locked positions. The user can then open cooker 4 and place first and second grills 112 and 114 along with the food onto base 110 (which is already inside cooker 4) and quickly close the lid of cooker 4. When the food needs to be flipped over, the user opens the lid of cooker 4 and rotates grills 112 and 114 from the first registered position to the second registered position. This can be performed quickly. The user then closes the lid of cooker 4 with a minimum of heat and moisture escaping from cooker 4. When the food is cooked, the user opens cooker 4 and removes grills 112 and 114 and places the assembly on the stand where cam lock handles are moved to the unlocked positions. Second grill 114 is then removed and the food can be removed from first grill 112.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. In combination, a kamado cooker and a selectively rotatable grill assembly removably carried within the kamado cooker; the combination comprising:
   the kamado cooker having a body that defines a lower firebox;
   the kamado cooker also having a lid that is movable between open and closed positions;
   the grill assembly including a base and first and second grills that are selectively rotatably carried by the base between first and second horizontal positions;
   the grill assembly also including a retaining assembly that establishes the first and second horizontal positions of the first and second grills with respect to the base;
   the base being supported by the body of the cooker to selectively rotatably carry the first and second grills within the cooker above the firebox; and
   the grill assembly further including first and second pivot pins projecting from opposite sides of the first grill; the first and second pivot pins engaging the base to support the first grill from the base; the first and second grills rotating together about an axis defined by the first and second pivot pins;
   wherein a first portion of the retaining assembly is carried by one of the pivot pins;
   wherein a second portion of the retaining assembly is carried by the base;
   wherein the second portion of the retaining assembly is a lock projection and the first portion of the retaining assembly is a notched positioner cam having oppositely disposed concave notches sized to receive the lock projection; the positioner cam engaging the lock projection.

2. The combination of claim 1, wherein the second grill is carried by the first grill.

3. The combination of claim 2, wherein the spacing between the first and second grills is adjustable.

4. The combination of claim 3, wherein the first grill includes a plurality of adjuster rods that extend through the second grill; the second grill carrying a lock assembly for each adjuster rod; each lock assembly adapted to engage the adjuster rod to hold the position of the second grill with respect to the first grill.

5. The combination of claim 4, wherein each lock assembly includes a cam lock handle having an enlarged portion that engages the adjuster rod when the cam lock handle is moved inward towards the second grill.

6. The combination of claim 5, wherein each cam lock handle includes an offset middle portion that positions an outer portion of the cam lock handle offset from the adjuster rod.

7. The combination of claim 1, wherein the first and second grills can be lifted from the base to separate the first and second grills from the base.

8. In combination, a kamado cooker and a selectively rotatable grill assembly removably carried within the kamado cooker; the combination comprising:
   the kamado cooker having a body that defines a lower firebox and an inwardly-projecting ledge disposed above the firebox;
   the kamado cooker also having a lid that is movable between open and closed positions;
   the grill assembly including a base and first and second grills that are selectively rotatably carried by the base between first and second horizontal positions;
   the grill assembly also including a retaining assembly that establishes the first and second horizontal positions of the first and second grills with respect to the base;
   the base being supported on the inwardly-projecting ledge to selectively rotatably carry the first and second grills within the cooker above the firebox;
   the grill assembly being configured to be disposed inside the kamado cooker when the lid of the kamado cooker is in the closed position;
   the grill assembly further including first and second pivot pins projecting from opposite sides of the first grill; the first and second pivot pins engaging the base to support the first grill from the base; the first and second grills rotating together about an axis defined by the first and second pivot pins;
   wherein the base includes a ring-shaped element with first and second supports projecting up from the ring-shaped element; each of the first and second supports defining a slotted cradle end that receives one of the pivot pins;
   a first portion of the retaining assembly being carried by one of the pivot pins;
   a second portion of the retaining assembly being carried by the base; and
   wherein the second portion of the retaining assembly is a lock projection and the first portion of the retaining assembly is a notched positioner cam having oppositely disposed concave notches sized to receive the lock projection; the positioner cam engaging the lock projection.

9. The combination of claim 8, wherein the lock projection is carried by one of the first and second supports.

10. The combination of claim 9, wherein the positioner cam is elongated and includes smoothly rounded peaks on each side of each concave notch.

11. The combination of claim 8, wherein each of the first and second grills includes a grate; the spacing of the first and second grills being adjustable with respect to each other to a position wherein the grate of the first grill touches the grate of the second grill.

12. In combination, a kamado cooker and a selectively rotatable grill assembly removably carried within the kamado cooker; the combination comprising:
    the kamado cooker having a body that defines a lower firebox;
    the kamado cooker also having a lid that is movable between open and closed positions;
    the grill assembly including a base and first and second grills that are selectively rotatably carried by the base between first and second horizontal positions;
    the grill assembly also including a retaining assembly that establishes the first and second horizontal positions of the first and second grills with respect to the base;
    the base being supported by the body of the cooker to selectively rotatably carry the first and second grills within the cooker above the firebox;
    the second grill being carried by the first grill;
    the spacing between the first and second grills being adjustable;
    the first grill including a plurality of adjuster rods that extend through the second grill;
    the second grill carrying a lock member for each adjuster rod;
    each lock member pivoting with respect to the second grill about a lock member axis that is spaced from a longitudinal exis of the respective adjuster rod between a locked position in which the lock member engages the respective adjuster rod and an unlocked position in which the lock member does not engage the respective adjuster rod; and
    when in the locked position, each lock member engaging one of the adjuster rods to hold the position of the second grill with respect to the first grill.

13. The combination of claim 12, wherein an entire body of the second grill is movable with respect to the first grill when all of the lock members are in the unlocked positions.

14. The combination of claim 13, wherein each of the first and second grills includes a grate; the spacing of the first and second grills being adjustable with respect to each other to a position wherein the grate of the first grill is parallel with and touches the grate of the second grill.

15. The combination of claim 12, wherein the first and second grills can be lifted from the base to separate the first and second grills from the base.

16. The combination of claim 12, wherein the retaining assembly includes a notched positioner cam having oppositely disposed notches; one of the notches engaging a portion of the base in each of the first and second horizontal positions of the first and second grills with respect to the base.

17. In combination, a kamado cooker and a selectively rotatable grill assembly removably carried within the kamado cooker; the combination comprising:
    the kamado cooker having a body that defines a lower firebox;
    the kamado cooker also having a lid that is movable between open and closed positions;
    the grill assembly including a base and first and second grills that are selectively rotatably carried by the base between first and second horizontal positions;
    the grill assembly also including a retaining assembly that establishes the first and second horizontal positions of the first and second grills with respect to the base;
    a lock projection;
    the retaining assembly including a notched positioner cam having oppositely disposed notches; one of the notches engaging the lock projection in each of the first and second horizontal positions of the first and second grills with respect to the base;
    the base being supported by the body of the cooker to selectively rotatably carry the first and second grills within the cooker above the firebox; and
    the second grill being carried by the first grill.

18. The combination of claim 17, wherein the positioner cam is elongated and includes smoothly rounded peaks on each side of each concave notch.

19. The combination of claim 17, wherein the spacing of the first and second grills is adjustable.

\* \* \* \* \*